United States Patent
Weiss

(10) Patent No.: US 7,329,857 B1
(45) Date of Patent: *Feb. 12, 2008

(54) SIDE-EMITTING FIBER OPTIC POSITION SENSOR

(75) Inventor: Jonathan D. Weiss, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 74 days.

This patent is subject to a terminal disclaimer.

(21) Appl. No.: 11/389,660

(22) Filed: Mar. 24, 2006

Related U.S. Application Data

(60) Provisional application No. 60/778,129, filed on Mar. 1, 2006.

(51) Int. Cl.
*G01J 1/04* (2006.01)
*G01J 1/42* (2006.01)
*G01J 5/08* (2006.01)
*G02B 6/00* (2006.01)

(52) U.S. Cl. .................................. 250/227.11; 385/12

(58) Field of Classification Search ............ 250/227.11, 250/483.1, 484.2, 485.1, 361 R; 356/73.1, 356/614, 615, 622; 385/12–14
See application file for complete search history.

(56) References Cited

U.S. PATENT DOCUMENTS

| | | | |
|---|---|---|---|
| 4,081,672 A * | 3/1978 | Caspers et al. ......... | 250/227.24 |
| 4,275,965 A | 6/1981 | Snitzer et al. | |
| 4,488,773 A | 12/1984 | Wagner | |
| 4,727,247 A | 2/1988 | Johnston | |
| 4,822,746 A | 4/1989 | Walt | |
| 4,870,292 A | 9/1989 | Alpert et al. | |
| 4,942,306 A | 7/1990 | Colbourne | |
| 4,994,682 A | 2/1991 | Woodside | |
| 5,005,005 A | 4/1991 | Brossia et al. | |
| 5,072,617 A | 12/1991 | Weiss | |
| 5,187,545 A | 2/1993 | Allgauer | |

(Continued)

OTHER PUBLICATIONS

Weiss, Jonathan, "A Fluorescent Long-Line Fiber-Optic Position Sensor", SENSORS, Mar. 2005.

(Continued)

*Primary Examiner*—Georgia Epps
*Assistant Examiner*—Suezu Ellis
(74) *Attorney, Agent, or Firm*—Robert D. Watson

(57) ABSTRACT

A side-emitting fiber optic position sensor and method of determining an unknown position of an object by using the sensor. In one embodiment, a concentrated beam of light source illuminates the side of a side-emitting fiber optic at an unknown axial position along the fiber's length. Some of this side-illuminated light is in-scattered into the fiber and captured. As the captured light is guided down the fiber, its intensity decreases due to loss from side-emission away from the fiber and from bulk absorption within the fiber. By measuring the intensity of light emitted from one (or both) ends of the fiber with a photodetector(s), the axial position of the light source is determined by comparing the photodetector's signal to a calibrated response curve, look-up table, or by using a mathematical model. Alternatively, the side-emitting fiber is illuminated at one end, while a photodetector measures the intensity of light emitted from the side of the fiber, at an unknown position. As the photodetector moves further away from the illuminated end, the detector's signal strength decreases due to loss from side-emission and/or bulk absorption. As before, the detector's signal is correlated to a unique position along the fiber.

14 Claims, 11 Drawing Sheets

U.S. PATENT DOCUMENTS

| | | |
|---|---|---|
| 5,387,791 A | 2/1995 | Weiss |
| 5,419,636 A | 5/1995 | Weiss |
| 5,422,495 A | 6/1995 | Cohn |
| 5,509,505 A | 4/1996 | Steger et al. |
| 5,585,915 A | 12/1996 | Kurosawa et al. |
| 5,781,679 A | 7/1998 | Li et al. |
| 5,880,475 A | 3/1999 | Oka et al. |
| 5,905,837 A | 5/1999 | Wang et al. |
| 5,995,686 A | 11/1999 | Hamburger et al. |
| 6,009,216 A | 12/1999 | Pruett et al. |
| 6,172,377 B1 | 1/2001 | Weiss |
| 6,347,172 B1 | 2/2002 | Keller et al. |
| 6,356,675 B1 | 3/2002 | Weiss |
| 6,546,174 B2 | 4/2003 | Clarkin |
| 6,592,245 B1 | 7/2003 | Tribelsky et al. |
| 6,693,285 B1 | 2/2004 | Weiss |
| 6,965,709 B1 | 11/2005 | Weiss |
| 7,049,622 B1 * | 5/2006 | Weiss .................. 250/577 |

OTHER PUBLICATIONS

"FAQ's for 3M(tm) Light Fiber", http://cms.3m.com/cms/US/en/2-197/kriliFR/view.jhtml#what, Mar. 16, 2006.

"Fiber Optic Cables", http://www.advancedlighting.com/downloads/ALSI%20Catalog%20-%20Cables.pdf, Mar. 16, 2006.

* cited by examiner

SIDE-EMITTING FIBER OPTIC POSITION SENSOR

CROSS-REFERENCE TO RELATED APPLICATIONS

This application claims the benefit of Provisional patent application Ser. No. 60/778,129 filed Mar. 1, 2006, which is incorporated herein by reference.

FEDERALLY SPONSORED RESEARCH

The U.S. Government has rights in this invention pursuant to Department of Energy Contract No. DE-AC04-94AL85000 with Sandia Corporation.

BACKGROUND OF THE INVENTION

The present invention relates generally to a method and apparatus for measuring the position of an object, and more specifically to position sensors that utilize side-emitting optical fibers.

Non-electrical position sensors are desirable for use in hazardous environments, e.g., for measuring the liquid level in gasoline or jet fuel tanks. All-optical position sensors based on the use of fiber optics would be an attractive choice because they would introduce no electrical energy, be insensitive to electromagnetic interference, have few moving parts (if any), and could provide continuous measurements.

Large-scale rotary drilling for oil and gas, minerals, and water wells, have a need for measuring the depth of drill bits and pipe segments. Measuring the length of a cable played out is often inaccurate because the cable stretches under heavy loads. An auxiliary cable under minimal tension can be used, but it can interfere with the drilling operation and is generally considered to be undesirable. Hence, a need exists for a long-range position sensor (e.g., greater than 10 meters), that is non-contact, simple, cheap, reliable, compact, non-electrical, and robust (i.e., able to withstand drilling mud and debris).

One approach is to use optical position sensors based on fluorescent fiber optics (e.g., U.S. Pat. No. 6,965,709 to Weiss). The operation of these sensors depends on the fluorescence generated in the fiber by an external pump source and its subsequent absorption as it is guided toward either end of the fiber. Since the fluorescence is generated isotropically within a small, localized region; and since its subsequent absorption depends on the path length traversed within the fiber, the ratio of optical signals outputted at the two ends can be used to determine the position of the external pump source, regardless of the individual strengths of the output signals.

However, since these types of sensors rely on fluorescence, the wavelength of the excitation (i.e. pump) light is typically limited to a fairly-narrow absorption band where stimulation (i.e., pumping/excitation) occurs. Hence, a needs exists for an optical position sensor that does not require the use of fluorescent dopants; that can operate over a wide range of wavelengths; and that has a reduced cost.

These, and other features, have been achieved in the present invention by replacing the fluorescent fibers with side-emitting fibers, which operate over a much wider range of wavelengths, and at a reduced cost.

SUMMARY OF THE INVENTION

The present invention relates to a side-emitting fiber optic position sensor and method of determining an unknown position of an object by using the sensor. In one embodiment, a concentrated beam of light source illuminates the side of a side-emitting fiber optic at an unknown axial position along the fiber's length. Some of this side-illuminated light is in-scattered into the fiber and captured. As the captured light is guided down the fiber, its intensity decreases due to loss from side-emission away from the fiber and from bulk absorption within the fiber. By measuring the intensity of light emitted from one (or both) ends of the fiber with a photodetector(s), the axial position of the light source is determined by comparing the photodetector's signal to a calibrated response curve, look-up table, or by using a mathematical model. Alternatively, the side-emitting fiber is illuminated at one end, while a photodetector measures the intensity of light emitted from the side of the fiber, at an unknown position. As the photodetector moves further away from the illuminated end, the detector's signal strength decreases due to loss from side-emission and/or bulk absorption. As before, the detector's signal is correlated to a unique position along the fiber.

BRIEF DESCRIPTION OF THE DRAWINGS

The accompanying drawings, which are incorporated in and form part of the specification, illustrate various embodiments of the present invention and, together with the detailed description, serve to explain the principles of the invention.

DETAILED DESCRIPTION OF THE INVENTION

Figure 1:
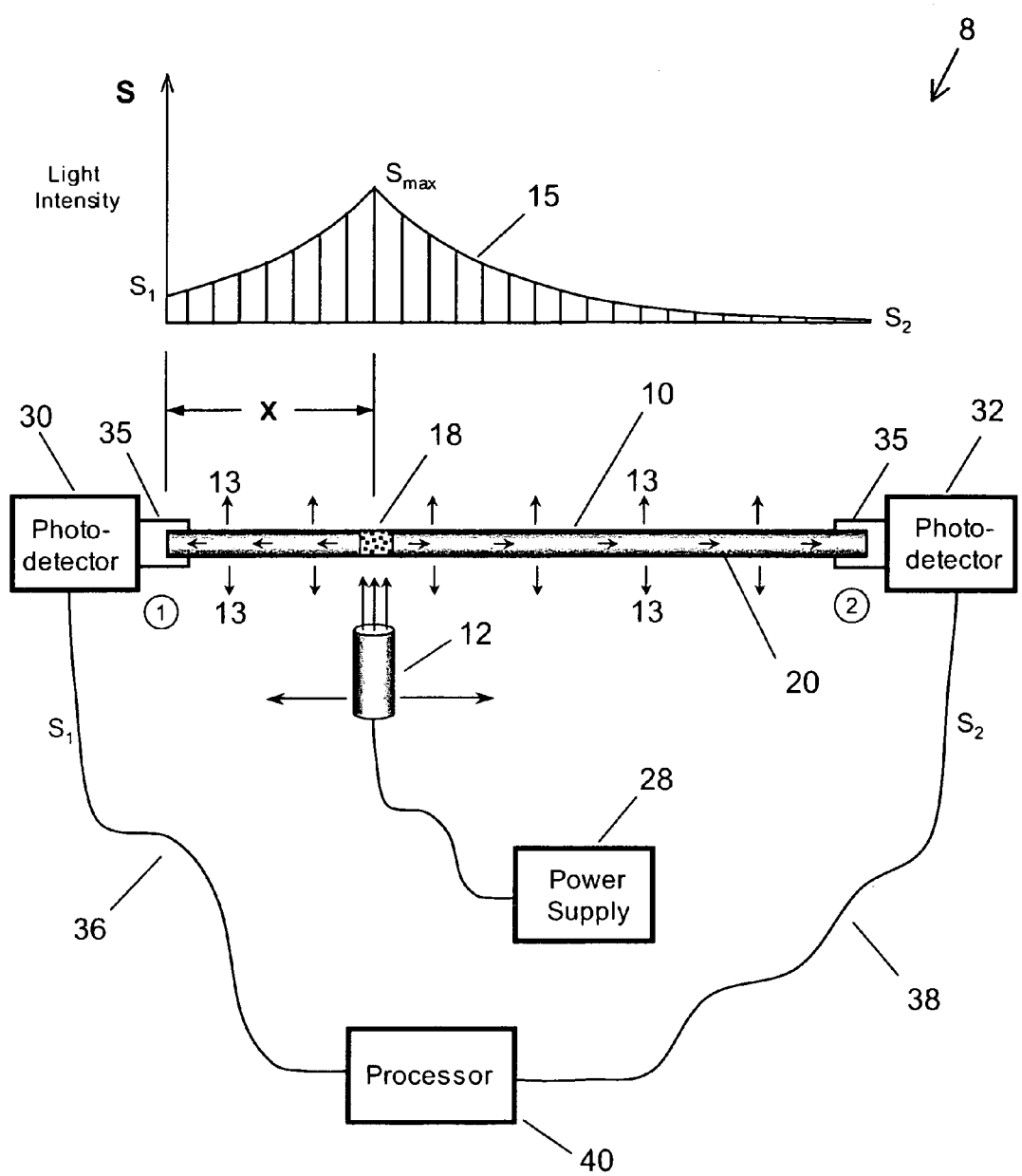
FIG. 1 illustrates a schematic view of an embodiment of a side-emitting fiber optic position sensor, according to the present invention.

As used herein, the words "light" and "optical" include not only the visible spectrum, but also the infrared and near UV spectrum, as well. The term "light" includes both coherent and incoherent light; as well as including both monochromatic and polychromatic or multi-spectral light.

The methods and sensors of the present invention utilize "side-emitting" fiber optics. These fibers, which are commonly referred to as "side-emitting fibers" are commercially available from a number of different manufacturers, e.g. Super Vision International, Inc. (http://www.svision.com); Intelite, Inc. (http://www.intelite.com); Ashai Chemical Industry Col, Ltd. (http://www.asahi-kasei.co.jp), and others. Side-emitting fibers can be as simple as a single plastic or glass core without any cladding or coating. Then, depending on the index of refraction of the surrounding media, light sent into the core is lost through the sides because it is not trapped or internally guided. More typically, however, the plastic or glass core is clad with a different material than the core. To make the fiber "side-emitting", scattering defects are introduced into the fiber at various location. In one method, the core region is doped with small refractive and/or reflective light-scattering particles during manufacture. Alternatively, the surface of the core is modified or treated to have surface features ("defects") that scatter light out of the core. Some examples of light-emitting surface defects include serrations, notches, scratches, texture, roughness, corrugations, etching, abrasion, etc. The entire length of fiber can be modified or treated to have side-emitting properties, or just a portion of the fiber (i.e., a portion along the length or circumference of the fiber, or both). Another technique involves twisting or braiding a bundle of fibers into a "rope" which side-emits light due to the bending of the fibers. Combinations of these techniques can be used, e.g., reflective particles in the core with scratches or notches on the core's surface. Also, the index of refraction of the surrounding media (e.g., dry air, humid air, inert gas, vacuum, a liquid, etc.) can affect the amount of light lost by side-emission from scattering defects. Hence, the rate at which light is lost via side-emission, e.g., per unit length, is highly controllable.

Accordingly, the terms "scattering-out", "out-scattering", "scattering-in", and "in-scattering" are defined herein to include reflection and/or refraction processes, but not fluorescence. For example, the term "in-scattering" includes any combination of the following processes: (1) reflection from internal scattering defects, (2) refraction from internal scattering defects, (3) refraction from bent fibers, and (4) refraction across interfaces between the core and its surrounding media.

The term "side-emitting fibers", as used herein, and as used conventionally in commercial practice, is defined herein as meaning fibers that can "glow" or emit light along their length without requiring the use of fluorescent materials to create the glowing light. This definition is necessary in order to distinguish between fluorescent fibers and side-emitting fibers (and, also, from common end-emitting fibers), even though fluorescent fibers emit light from their sides.

Side-emitting fibers also inherently function in reverse, i.e., as "side-receiving" fibers, because the same defects that "scatter" light out of the fiber (i.e., when illuminated from the end) can also "scatter" light into the fiber (i.e., when illuminated from the side). In this case, side-illuminated light that is "trapped" or "collected" in this way is called "in-scattered" light. Hence, a side-emitting fiber is also a side-receiving fiber. Accordingly, the term "side-emitting fibers"and the term "side-receiving fibers" are used interchangeably herein, unless otherwise stated. Hence, in some embodiments, the side-emitting fiber may be illuminated from both the side and from the end of the fiber, with the same, or different, type of light.

In some embodiments of the present invention, the side-emitting fibers may optionally be doped with one or more fluorescent materials. In this case, the light source used in the position sensor may be chosen to have a wavelength that excites fluorescence in the doped+side-emitting fiber. However, in other embodiments, the side-emitting fibers do not comprise any fluorescent materials.

FIG. 1 illustrates a schematic view of a first embodiment of a side-emitting fiber optic position sensor 8, according to the present invention. Sensor 8 comprises a side-emitting fiber optic 10, with a pair of photodetectors 30 and 32 attached to ends "1" and "2" of fiber 10 via optical couplers 34 and 35, respectively. Light source 12 is positioned at an unknown distance X from the left end "1" of fiber 10, and is oriented to illuminate the side of fiber 10 with a small, concentrated beam of light. Because side-emitting fiber 10 also behaves as a "side-receiving" fiber, some of the impinging light from source 12 is "in-scattered" into the fiber and captured within a small, localized zone 18. Note that this zone is analagous to the small, localized zone of fluorescent light that would be generated in a fluorescent fiber optic, (if the wavelength of light source 12 within the fluorescent fiber's excitation band).

The light that is "in-scattered" and captured in zone 18 is then guided along fiber 10 to both ends (note: the light that is guided along fiber 10 is designated "guided light 20", with reference to FIG. 1). Photodetectors 30 and 32 measure the intensity, $S_1$ and $S_2$, of light emitted from ends "1" and "2" of fiber 10. Photodetectors 30, 32 may comprise photodiodes, CCD elements, etc., as is well known in the art; and can be chosen to detect light not only the visible spectrum, but also the infrared and near UV spectrum, as needed. Power supply 28 provides power to light source 12. The electrical output from photodetectors 30 and 32 is connected to processor 40 via electrical cables 36 and 38, respectively. Alternatively (not shown), the photodetector signals may be transmitted wirelessly to processor 40. Processor 40 comprises analog or digital computer processing means, memory means, etc., for calculating the axial position, X, of light source 12 based on the measured intensity values of either $S_1$, or $S_2$, or, both $S_1$ and $S_2$. Light source 12 may be coherent, incoherent, monochromatic, or polychromatic/multi-spectral, or combinations thereof. For example, source 12 may be a blue or red LED.

In FIG. 1, curve 15 schematically illustrates the variation in intensity, S, of guided light 20 inside of fiber 10, as a function of distance, X, as measured (arbitrarily) from the left end of the fiber. The exponential-like decay in light intensity in both directions away from the peak, $S_{max}$, at position "X" (i.e., the center of light source 12) is caused by two effects. First, some of guided light 20 is lost from the core of fiber 10 due to side-emission 13 along the length of fiber 10. Second, some of guided light 20 is absorbed in the fiber's core itself as it travels down the fiber. This second effect (i.e., bulk absorption) is typically more pronounced in plastic fibers than in glass fibers. Either one, or both of these effects attenuates the intensity of guided light 20 as one travels further and further away from light source 12, in either direction. Hence, by the time that guided light 20 has reached either end "1" or "2" of fiber 10, its intensity, S, at that end has been attenuated by an amount that depends uniquely on the specific axial location of light source 12.

Optionally, sensor 8 may comprise a single photodetector (e.g., photodetector 30) attached to only one end of fiber 10. In this case, the other end of fiber 10 may have a mirrored surface to reflect light back in the other direction.

It should be clear that any sort of object may be attached to light source 12 in such a manner that the position of the object, relative to the coordinate system of the fiber optic 10, may be determined by measuring the position of the attached light source 12 in the manner presented herein using sensor 8.

Any variety of mechanical motion control devices (not shown), including sliding or rolling bearings, tracks, etc. may be used to confine the motion of light source 12 to travel smoothly and continuously along the path defined by the shape of fiber 10, including straight and curved paths. Such a motion control device may also be used to hold light source 12 at a constant distance (spacing) away from the surface of fiber 10, and at a constant angle of incidence (e.g., perpendicular). However, it is not required to hold light source 12 at a constant distance (spacing) away from the surface of fiber 10, or at a constant angle of incidence (e.g., perpendicular), since the ratio of the output signals, $S_1/S_2$, is independent of the degree of coupling of excitation light into the fiber, as will be discussed shortly.

Light source 12 may be a continuous, steady-state source; or it may be modulated, amplitude modulated, frequency modulated, pulsed, or any combination thereof. Multiple light sources may be used at the same, or different, axial position along fiber 10; with each source having a unique wavelength, modulation pattern, modulation frequency, etc. Using appropriate filtering and digital processing, the photodetector signals can be de-modulated to separate out the individual contributions from each independent light source.

If exposed, side-emitting fiber 10 can collect ambient light, such as sunlight or indoor fluorescent lighting. However, if the ambient light is uniform along the length of fiber 10, then both of the signals $S_1$ and $S_2$ will be affected by approximately the same amount. Additionally, a calibrated response curve may be used to account for the effect of ambient light. Alternatively, any undesired signal, S, contributed by ambient light may be effectively eliminated by modulating the output of light source 12 at a high frequency, e.g. greater than 10 KHz, and then electrically or digitally filtering out all signals that are below this frequency (e.g., sunlight is DC, and fluorescent lighting oscillates at 60-120 Hz).

In some embodiments, the side-emission properties (i.e., the loss rate of side-emitted light per unit length) and the bulk absorption properties of the core are uniformly distributed along the entire length of fiber 10 (i.e., by having uniformly-distributed scattering defects along the length of the fiber). In this case, the following equations can be used to describe an approximate, simple relationship between the output intensities ($S_1$ and $S_2$), and the unknown position, X, of light source 12.

$$S_1 = k e^{-\alpha X} \quad (1)$$

$$S_2 = k e^{-\alpha(L-X)} \quad (2)$$

$$S_1/S_2 = e^{\alpha L} e^{-2\alpha X} \quad (3)$$

where $\alpha = 0.23$ B, and B=Fiber Attenuation Coefficient (in db/meter).

The Fiber Attenuation Coefficient, B, depends on both the side-emission properties (i.e., the loss rate of side-emitted light per unit length) and the bulk absorption properties of the core. As an example, assume that the fiber attenuation coefficient, B, equals 0.3 db/meter, and the fiber is 30 meters long (L=30), then the signal ratio, $S_1/S_2$=7.9 when the light source 12 is positioned at the left end (X=0). When the light source 12 is positioned at the far right end (X=30 meters), then $S_1/S_2$=0.13. When the source is positioned exactly at the middle (X=15 meters), then $S_1/S_2$ =1.

Solving for X from eq. (3), we get equation (4):

$$X = \frac{L}{2} - \frac{1}{2\alpha} \ln(S_1/S_2) \quad (4)$$

This simple exponential response is called "single-ended" because the origin of the X-coordinate system is located at one end of the fiber. On the other hand, a clear symmetry exists with respect to the center of the fiber. Consequently, if it is desired that the position of light source 12 should be measured from the center of the fiber, then equations (1)-(3) can be appropriately rewritten in a "centered" coordinate system.

It is not a requirement of the present invention that the axial distribution of scattering defects, or of the bulk absorption properties, be uniform along the length of fiber 10. In these cases, a calibration curve can be generated that provides a unique relationship between the position of light source 12 and the intensity of output signals $S_1$ and $S_2$, and/or the ratio of $S_1/S_2$. Note that when referring to the ratio of output signals, $S_1/S_2$ we also intend to include equal consideration of the inverse ratio, i.e., $S_2/S_1$ in the discussion of the method and apparatus of the present invention. However, if the Fiber Attenuation Coefficient, B, is reasonably uniform along the length, then equations (1)-(3) can be used to provide a reasonably accurate prediction of the sensor's response. If the Fiber Attenuation Coefficient is too high for a given fiber length, L, the signal at one or both ends could be too low. Conversely, if the Fiber Attenuation Coefficient is too low, then the output signals at both ends will be large, and will not change much as light source 12 moves along the fiber optic fiber 10.

Plastic fiber optics generally have high bulk absorption coefficients, and could be appropriate for ranges of less than about 100 feet, while glass fibers could be more appropriate for lengths greater than about 100 feet.

Light source 12 may comprise a variety of sources, including lasers, LED's, Vertical Cavity Surface Emitting Lasers (VCSEL's), monochromatic incoherent light sources (e.g., tungsten, mercury, or sodium vapor), incandescent light sources, sunlight, ultraviolet and microwave sources.

Light source 12 may impinge on the side of fiber 10 at any angle, from normal (i.e., perpendicular) incidence down to a shallow, grazing angle, depending on the application.

Figure 2:
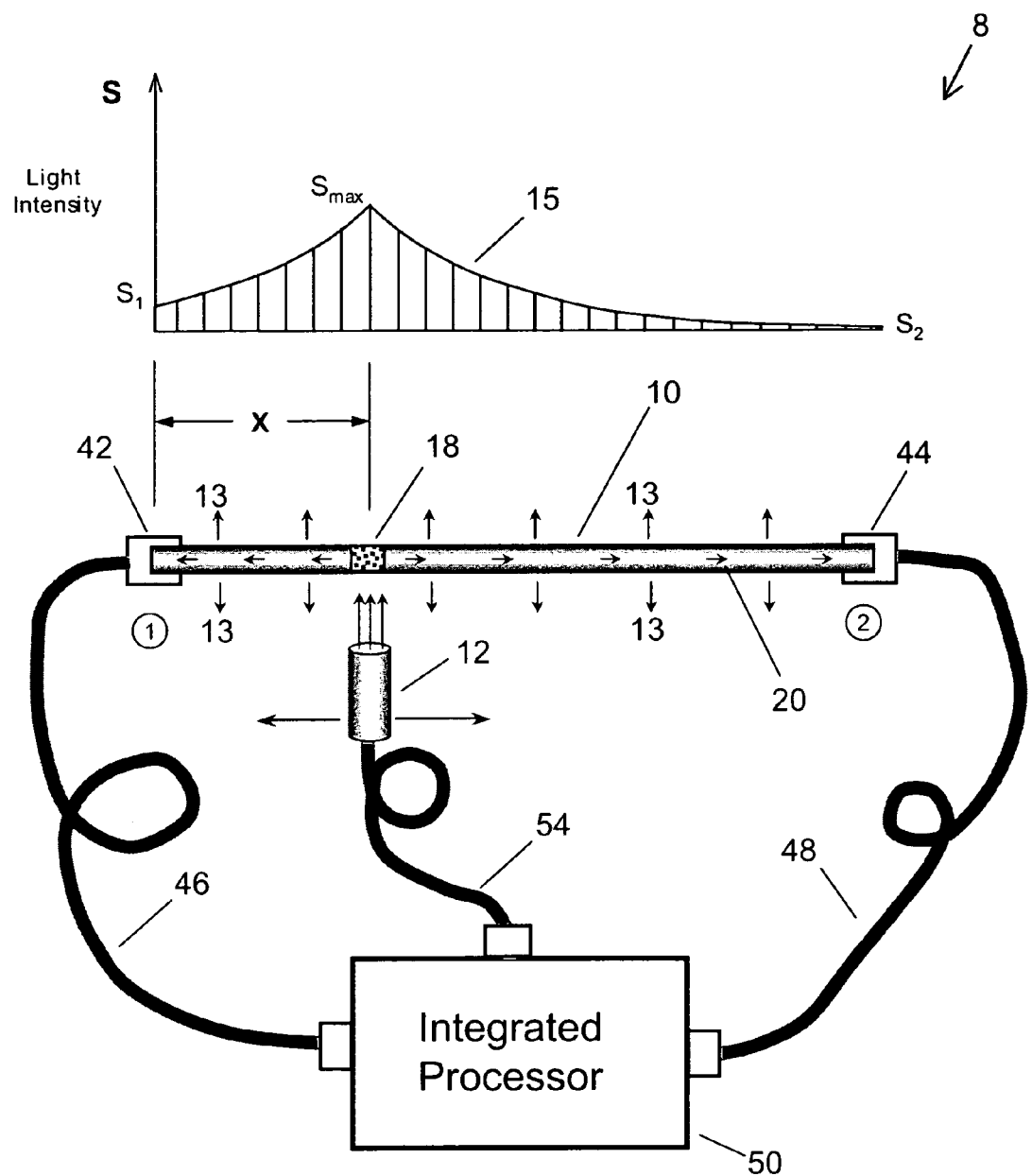
FIG. 2 illustrates a schematic layout of another embodiment of a side-emitting fiber optic position sensor, according to the present invention.

FIG. 2 shows a schematic layout of another embodiment of an optical position sensor 8, according to the present invention. Sensor 8 comprises fiber optic 10 with optical couplers 42 and 44 attached to the ends "1" and "2" of fiber optic 10, respectively. Clear, low-loss, non-absorbing fiber optics 46 and 48 are attached to couplers 42 and 44, respectively, which transmit light emitted from ends 1" and "2" to a pair of photodetectors contained within integrated processor 50. A clear, low-loss, non-absorbing fiber optic 54 is used to guide light from a light source located inside of integrated processor 50 to the other end of fiber 54, which side illuminates fiber optic 10. Light source 12 may comprise an annular, ring-like structure (not illustrated) that surrounds fiber optic 10 and provides a circumferentially uniform source of illumination light 12 at position=X. Integrated processor 50 may include a power source (including batteries) and other electronic components (not shown) for modulating the light source, amplifying and filtering the photodetector output, displaying, and storing the data and results, analyzing the data and calculating the unknown position, X, etc. All of the electrical components are contained within integrated processor 50, which can have an electrically-shielded housing. Only optical sensor components are located outside of processor 50, which allows use of the sensor 8 in explosive environments.

In other embodiments of the present invention, fiber 10 can move relative to a fixed light source 12, since it is the relative distance, X, between a reference point on fiber 10 and source 12 that is measured by position sensor 8.

In equations (1) and (2), the proportionality constant "k" that determines the intensity of output signal $S_1$ and $S_2$ depends on many different factors, including the concentration (i.e., density) of scattering defects, the electronic gain factors, the photodetector's sensitivity, the optical coupling efficiency from the fiber to the detector, the strength of the light source, and the fraction of light coupled into fiber 10 by in-scattering, the refractive index of the surrounding media, etc. Some of these factors may vary over time, such as the strength of light source 12 as it ages, or the efficiency of receiving light into the side-receiving fiber 10 if the radial separation distance between source 12 and the side of fiber 10 is not constant. However, barring signal-to-noise considerations, these generally unavoidable variations will not affect the ratio of the output signals, $S_1/S_2$, since the ratio of signals is independent of the constant "k", as can be seen from equation (3).

In another embodiment, position sensor 8 is operated using a single photodetector to measure the light emitted from only one end of fiber 10 (either $S_1$ or $S_2$, but not both). From equations (1) and (2), we see that use of a single photodetector requires knowledge of the constant "k" to achieve an absolute measurement of the source's position. Alternatively, a calibrated response curve for $S_1$ (and/or $S_2$) may be used to overcome a lack of a measurement for constant "k". Also, a calibrated response curve likely provides a more accurate measurement, since equations (1)-(3) only approximate the response of the system. Having the ability to measure distance with a single photodetector would be useful if a second photodetector coupled to the other end of fiber 10 fails, or is defective.

In another embodiment, a single photodetector may be used for measuring a change i.e., $\Delta X$ in the axial position, X, of source 12 relative to a previously measured position. If a first position, $X_a$, provides an output signal of $S_a$, and a second position, $X_b$, provides an output signal of $S_b$, then equation (5) can be used to calculate the relative change in position, $\Delta X$, as:

$$S_1/S_1' = e^{\alpha \Delta X} \quad (5)$$

where $\Delta X = |X_a - X_b|$. Solving for $\Delta X$, we get:

$$\Delta X = \frac{1}{\alpha} \ln(S_1/S_1') \quad (6)$$

where $\alpha = 0.23$ B, and B=Fiber Attenuation Coefficient (in db/meter). Here, we see that the constant "k" and the fiber's total length "L" disappears from equations (5) and (6).

In the previous embodiments shown in FIGS. 1-2, the coordinate system used is a one-dimensional, Cartesian-type, linear coordinate system. However, the method and apparatus of the present invention can be generalized to a one-dimensional, curvilinear coordinate system, such as the one illustrated schematically in FIG. 3.

Figure 3:
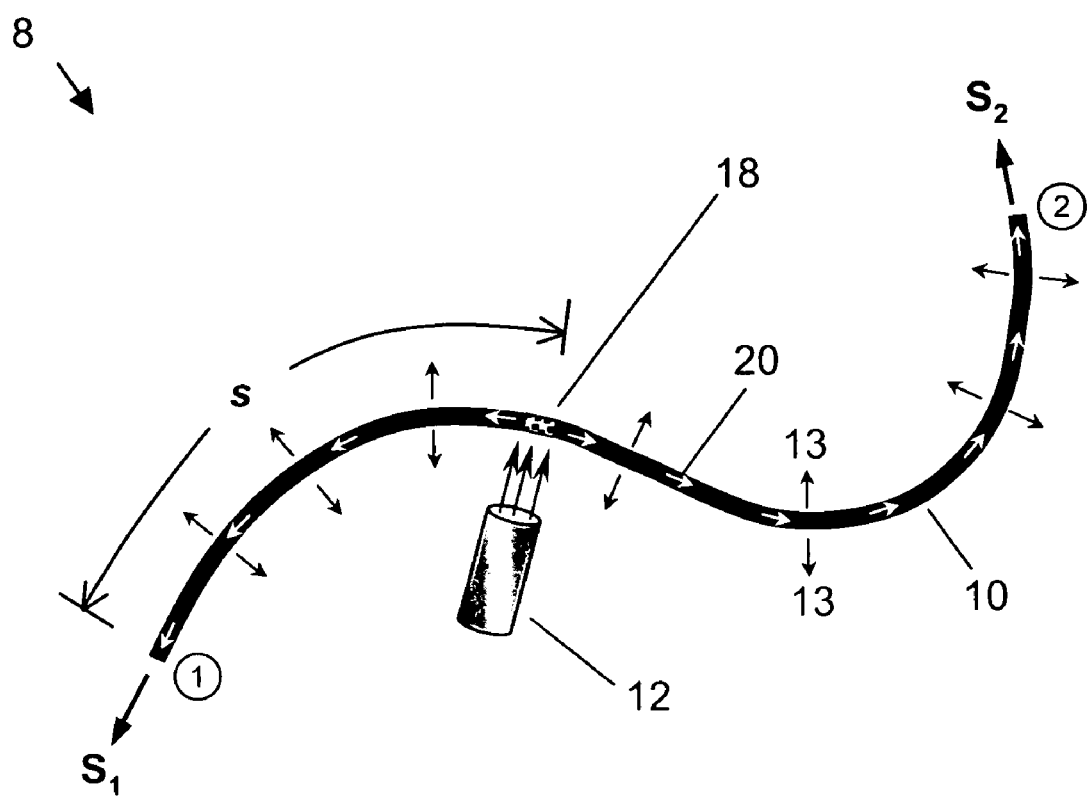
FIG. 3 illustrates a schematic layout of another embodiment of a side-emitting fiber optic position sensor, according to the present invention.

FIG. 3 shows a schematic layout of another embodiment of a side-emitting fiber optic position sensor 8, according to the present invention. Here, side-emitting fiber 10 is curved in one or more directions. The position of light source 12 can be defined in terms of a one-dimensional, curvilinear coordinate, s, which closely follows the path of the curved shape of fiber 10. Hence, the curvilinear coordinate variable, S, is the path length from one end of fiber to the location of light source 12. In a "single-ended" system, equations (1)-(3) could be used equally well for the curved fiber 10 shown in FIG. 3 by simply substituting the curvilinear coordinate variable, s, for the linear Cartesian coordinate variable, X. Note that the shape of fiber 10 is drawn as being confined to the plane in FIG. 3, however, it is not necessary to confine a curved fiber 10 to lay on a single plane. Fiber 10 may be curved in any three-dimensional space, in a completely general way, and still be characterized by a one-dimensional, curvilinear coordinate, s, which closely follows the path of the curved shape of fiber 10.

Figure 4:
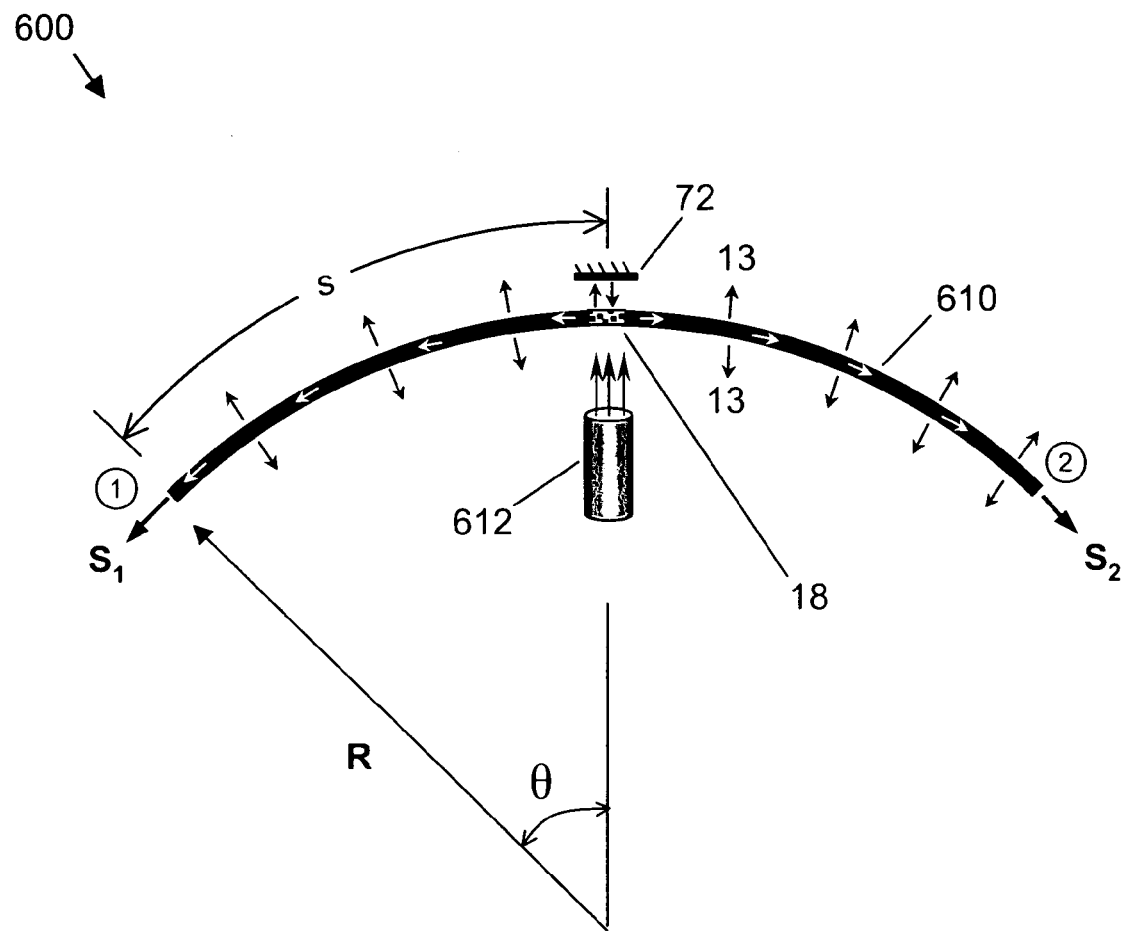
FIG. 4 illustrates a schematic layout of another embodiment of a side-emitting fiber optic position sensor, according to the present invention.

FIG. 4 shows a schematic layout of another embodiment of an optical position sensor 600, according to the present invention. Sensor 600 comprises side-emitting fiber optic 610, which is curved in a circular arc with radius=R. By comparing the measured intensity of output signals, $S_1$ and $S_2$ (or the ratio of signals $S_1/S_2$), in the manner presented earlier, the angular position of light source 612 can be determined by simply converting the curvilinear (i.e., circumferential) path length, S, to the angular position, θ. FIG. 4 also illustrates an optional mirror or reflecting surface 72 that can be placed behind fiber 610 to reflect light from source 612 back towards fiber 610 to generate a second pass at being in-scattered into the fiber. Mirror 72 can be flat or curved, as is well known in the art. Mirror 72 may be mechanically coupled to source 612, so that both elements move together as a single unit, when the source 612 moves along the length of fiber 610. Alternatively, mirror 72 may extend along the entire length of the fiber, in which case it would not need to be movable.

In general, in any of the different embodiments, a mirror or other reflecting surface may be placed behind the fiber to reflect light from a side-illuminating source back towards the fiber to generate a second pass (i.e. second chance) at being in-scattered into the fiber.

Figure 5:
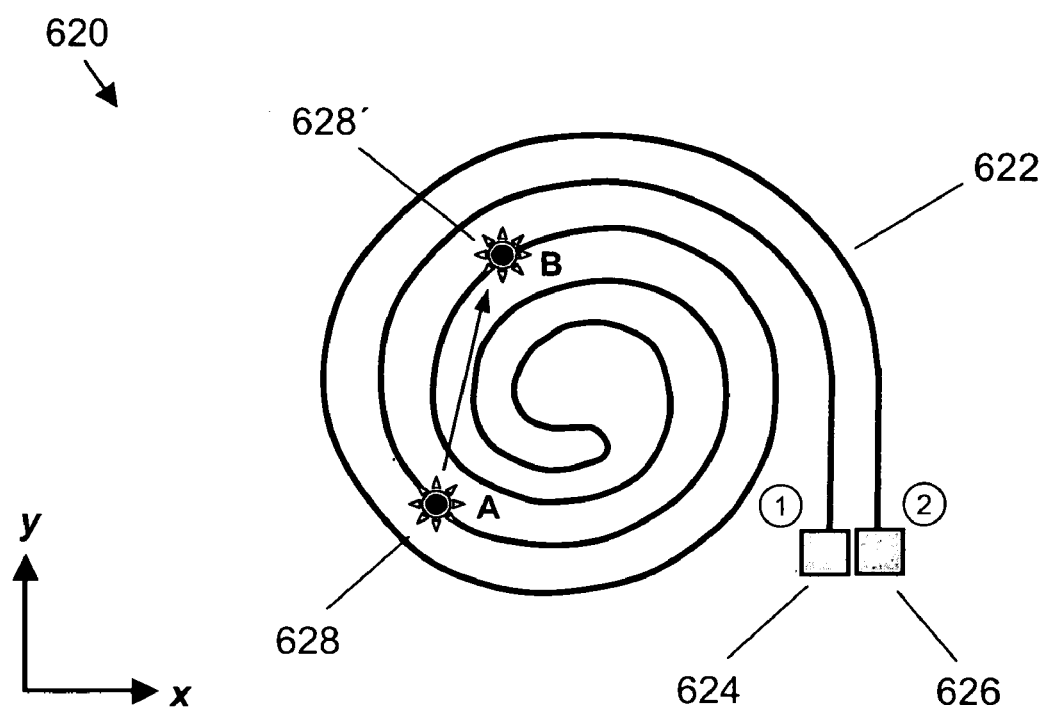
FIG. 5 illustrates a schematic layout of another embodiment of a side-emitting fiber optic position sensor, according to the present invention.

FIG. 5 shows a schematic layout of another embodiment of an optical position sensor 620, according to the present invention. Sensor 620 comprises a side-emitting fiber optic 622 laid out in a two-dimensional, double-spiral pattern. Movable light source 628 side-illuminates a localized region of fiber 622. The in-scattered light travels in either direction along fiber 622 towards ends "1" and "2", where photodetectors 624 and 626 measure the amount of attenuated guided light emitted from ends "1" and "2", respectively. The unknown curvilinear position, s, along the axis of fiber 622 (i.e., path length) can be determined by comparing the signals output from photodetectors 624 and 626, in the manner presented earlier. This information, combined with the knowledge of the (x,y) coordinates of the two-dimensional double-spiral pattern, allows a unique mapping to be made between the path length distance, s, and the (x,y) coordinate of light source 628. Accordingly, the two-dimensional motion of light source 628 as it moves from position "A" to position "B" can be uniquely determined using sensor 620.

Figure 6:
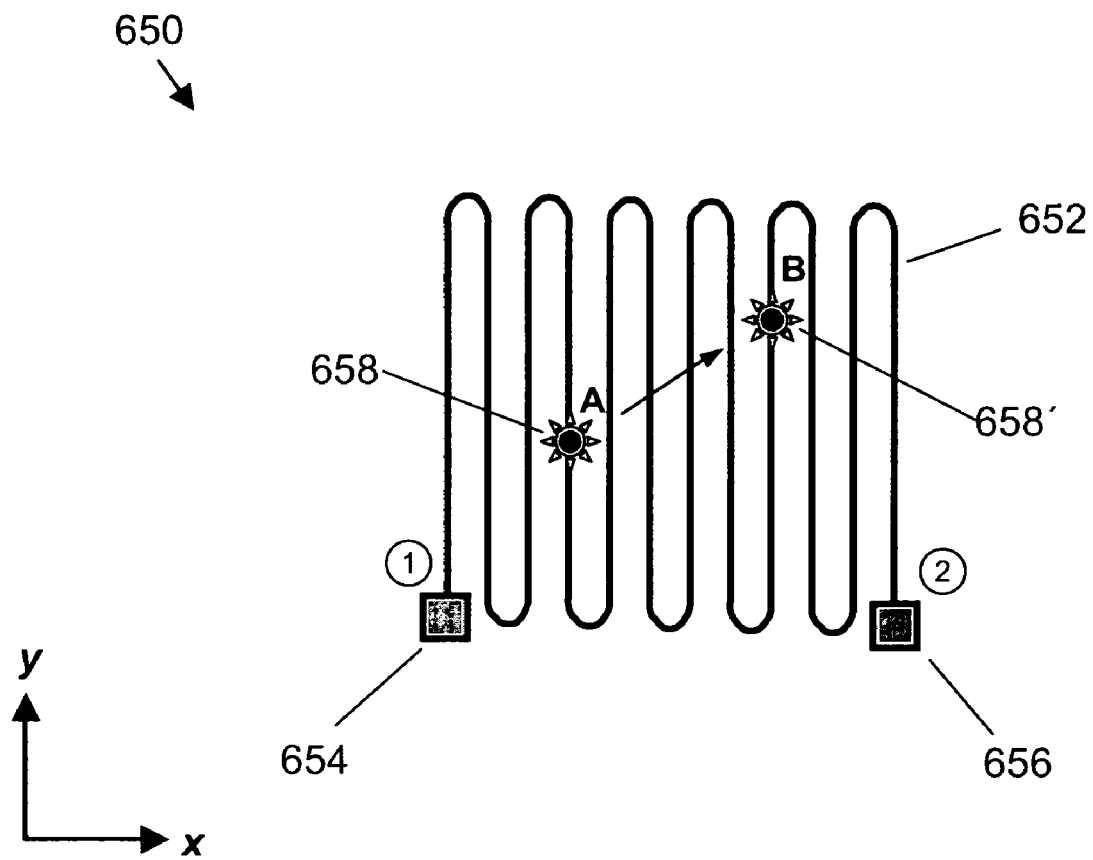
FIG. 6 illustrates a schematic layout of another embodiment of a side-emitting fiber optic position sensor, according to the present invention.

FIG. 6 shows a schematic layout of another embodiment of an optical position sensor 650, according to the present invention. Sensor 650 comprises a side-emitting fiber optic 652 laid out in a two-dimensional, serpentine (i.e., boustrophedon) pattern. Movable light source 628 side-illuminates a localized region of fiber 652. The in-scattered light travels in either direction along fiber 652 towards ends "1" and "2", where photodetectors 654 and 656 measure the amount of attenuated guided light emitted from ends "1" and "2", respectively. The unknown curvelinear position, s, along the axis of side-emitting fiber optic 652 (i.e., path length) can be determined by comparing the signals output from photodetectors 654 and 656, as presented earlier. This information, combined with the knowledge of the (x,y) coordinates of the out-out, two-dimensional serpentine pattern, allows a unique mapping to be made between the path length distance, s, and the (x,y) coordinate of light source 658. Accordingly, the two-dimensional motion of light source 658 as it moves from position "A" to position "B" can be uniquely determined using sensor 650. It should be noted that the change in photodetector output signal as light source 658 moves along the X-direction is "magnified", as compared to the arrangement illustrated in FIG. 1 (which has a straight fiber 10). Hence, the path length, s, traversed when light source 658 moves along the X-direction from one segment to another is approximately equal to the vertical length of a single segment (i.e., in the Y-direction) rather than simply the length along the axial coordinate, X, as would be the case for a straight fiber (see, e.g., FIG. 6). In this sense, a serpentine-type sensor 650 generates a greater change in output signal (i.e., magnified output) for the same amount of change in the position of the light source along the X-direction, relative to a sensor using a straight (unwrapped) fiber. The magnification factor provided by this serpentine/folded shape provides increased resolution, when compared to an unmagnified, straight fiber.

Figure 7:
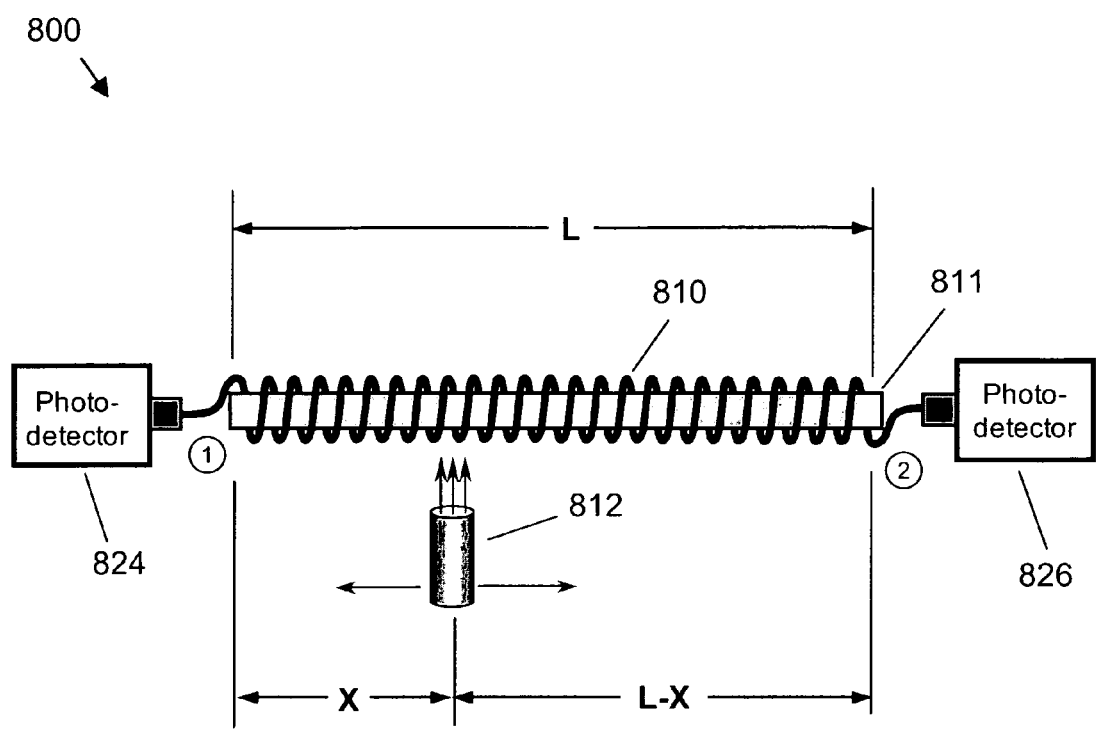
FIG. 7 illustrates a schematic layout of another embodiment of a side-emitting fiber optic position sensor, according to the present invention.

FIG. 7 shows a schematic layout of another embodiment of an optical position sensor 800, according to the present invention. Sensor 800 comprises a side-emitting fiber optic 810 wrapped in a helical (spiral) pattern about cylinder 811. Movable light source 812 side-illuminates a localized region of fiber 810. The in-scattered light travels in either direction along fiber 810 towards ends "1" and "2", where photodetectors 824 and 826 measure the amount of attenuated guided light emitted from ends "1" and "2", respectively. The unknown axial position, X, along the longitudinal axis of cylinder 811 can be determined by comparing the signals output from photodetectors 824 and 826, as presented earlier. Cylinder 811 may be opaque or transparent, solid, hollow, or tubular, depending on the application. It should be noted that the change in photodetector output signal as light source 812 moves along the X-direction, is "magnified" or "enhanced, when compared to the arrangement illustrated in FIG. 1 (which has a straight fiber 10). This is due to the fact that fiber optic 810 has been coiled or wrapped into a compact, helical shape. Hence, the path length, s, traversed when light source 812 moves axially from one coil to another is given by the circumference of the coil (2πR), rather than the axial distance, X, as would be the case for a straight fiber (see, e.g., FIG. 1). In this sense, a spiral-wrapped sensor generates a greater change in output signal (i.e., magnified output) for the same amount of change in the axial position of the light source, relative to a sensor using a straight (unwrapped) fiber. Thus, a spiral-wrapped/coil fiber design provides for enhanced position resolution, as compared to a straight fiber design. Note also that the best accuracy and reproducibility for position sensor 800 can be attained by providing good alignment of light source 812 with respect to the axial centerline of the helical/spiral pattern and cylindrical core 811, so that any motion perpendicular to the axis of travel (i.e., the primary direction), is minimized. Good concentric axial alignment may be achieved by providing an outer cylindrical tube/housing that closely fits around the outer surface of helically shaped fiber 810 (e.g., a piston/cylinder geometry). Alternatively, cylinder 811 may have a reflective outer surface, in order to produce a second pass of source light 812 through the fiber 810.

Figure 8:
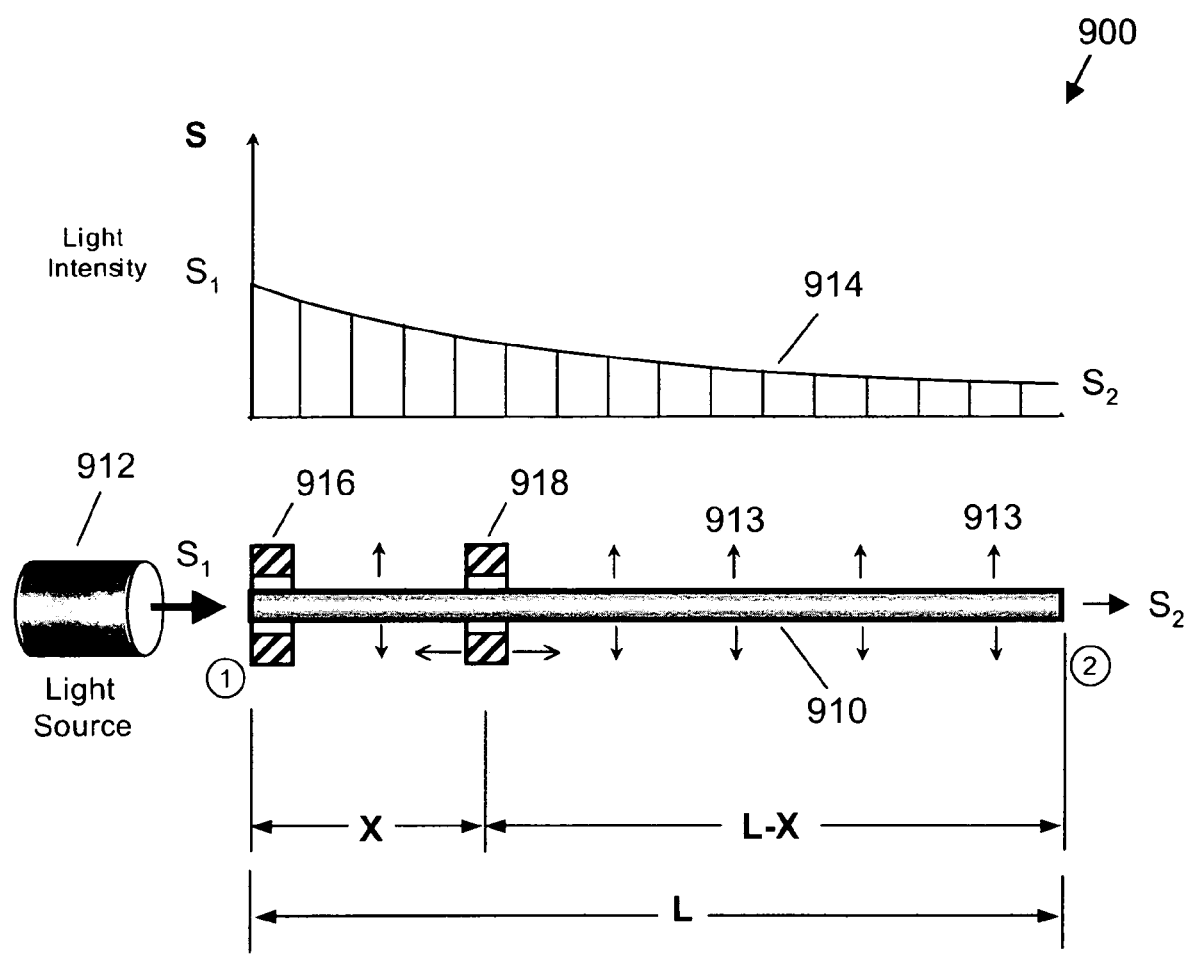
FIG. 8 illustrates a schematic layout of another embodiment of a side-emitting fiber optic position sensor, according to the present invention.

FIG. 8 shows a schematic layout of another embodiment of a side-emitting fiber optic position sensor 900, according to the present invention. Here, the positions of the light source and photodetectors are reversed from that shown previously in FIGS. 1-7. Here, in this "inverse" configuration, light source 912 illuminates the left end of side-emitting fiber 910 with an intensity equal to $S_1$. As the light from source 912 is guided down fiber 910, some of this light is continuously emitted from the side of the fiber, as well as possibly being absorbed by the bulk core. The intensity, S, of guided light decays in an exponential-fashion as a function of distance, X, as measured from the left end of fiber 910. This decay in light intensity, S, is illustrated schematically by curve 914. A pair of photodetectors 916 & 918 measure the intensity of light emitted at two different axial positions along fiber 910. Specialized ring-type photodetectors may be used, which circumferentially surrounds the fiber. A "reference" photodetector 916 is fixed at a stationary position on fiber 910, e.g., at the left end where the intensity of side-emitted light is greatest. A second, movable "ring-type" photodetector 918 is located at the unknown, variable position, X, where it measures a reduced, attenuated intensity of side-emitted light. A set of equations similar to equations (1)-(6) can be derived that express the unique relationship between measured light intensity and position along the fiber, in this "reversed" or "inverse" mode of operation. Optionally, the intensity of light, $S_2$, emitted from the opposite end of fiber 901 (i.e., the right end), may be measured with a third ring photodetector (not shown) located at the right end of fiber 901. This third photodetector could provide a reference signal. Alternatively, the right end of fiber 910 may be mirrored to reflect guided light backwards.

Ring-type photodetectors 916, 918 may comprise a loop, or loops, of side-receiving fiber or fibers.

Method of Operation

One embodiment of a method for measuring an unknown position, X, of an object by using a side-emitting fiber optic position sensor may comprise performing the following steps:

a) providing a side-emitting fiber optic position sensor comprising a side-emitting optical fiber having a first end, an opposing second end, a photodetector optically coupled to the first end for measuring a first intensity of light, $S_1$, emitted from the first end; and a one-dimensional curvilinear coordinate system, x, having an origin at the first end and extending along the fiber towards the second end;

b) side-illuminating the fiber with a concentrated beam of light; wherein the light source is located at an unknown axial position, X, along the fiber, as measured in the curvilinear coordinate system;

c) in-scattering some of the side-illuminating light into the fiber;

d) guiding the in-scattered light along the fiber;

e) attenuating the intensity of the guided light as the guided light travels further and further away from the unknown axial position, X;

f) measuring with the photodetector the intensity of light, $S_1$, emitted from the first end of the fiber;

g) determining the position, X, of the light source by comparing the measured light intensity, $S_1$, to a calibrated response curve or look-up table; or by inputting $S_1$ into a equation that approximately models the sensor's response.

In another embodiment, a second photodetector measures an intensity of light, $S_2$, emitted from the second end of the fiber; and the ratio of the two light intensities, $S_1/S_2$, is used to determine the position, X, of the light source. In one embodiment, attenuating the intensity of the guided light can comprise side-emitting light from the side of the fiber. Alternatively, or additionally, attenuating the intensity of the guided light can comprise absorbing light inside the bulk of the fiber.

Experimental Test Results

Figure 9:
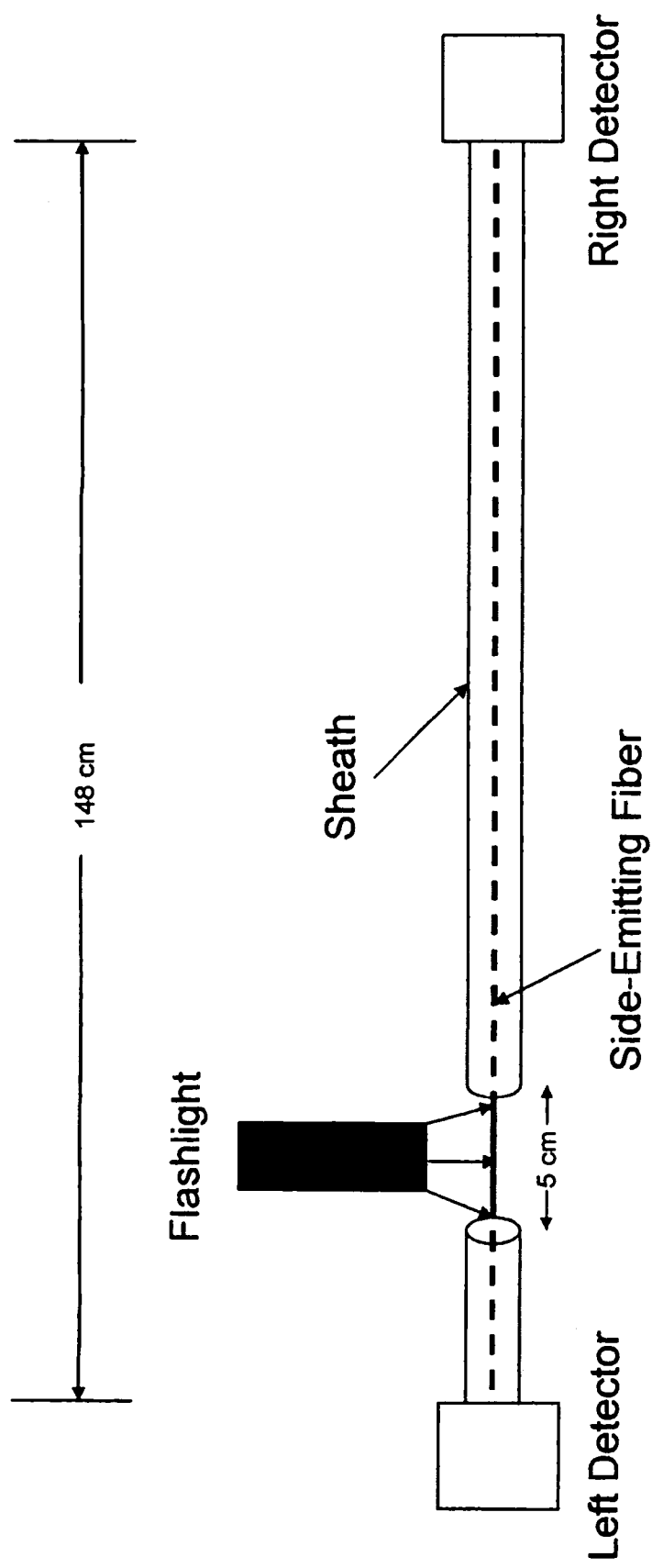
FIG. 9 illustrates a schematic layout of an experimental test setup of a side-emitting fiber optic position sensor, according to the present invention.

FIG. 9 shows a schematic layout, uncluttered by detail, of an experimental test setup, according to the present invention. A number of tests were performed that successfully demonstrated the design and principles of operation.

A 148-cm length of side-emitting fiber was connected to two photodetectors, left and right. The core diameter of the fiber was 0.8 mm. For a given measurement, all but about 5 cm of this fiber was sheathed to isolate it from ambient light. A flashlight was used to illuminate the exposed section. Aluminum foil (not shown) was placed beneath the fiber, which produced a second pass of the light from the flashlight through this exposed section. In addition, it was discovered that removing the plastic buffer from the exposed section of fiber increased the photodetector signal.

Figure 10:
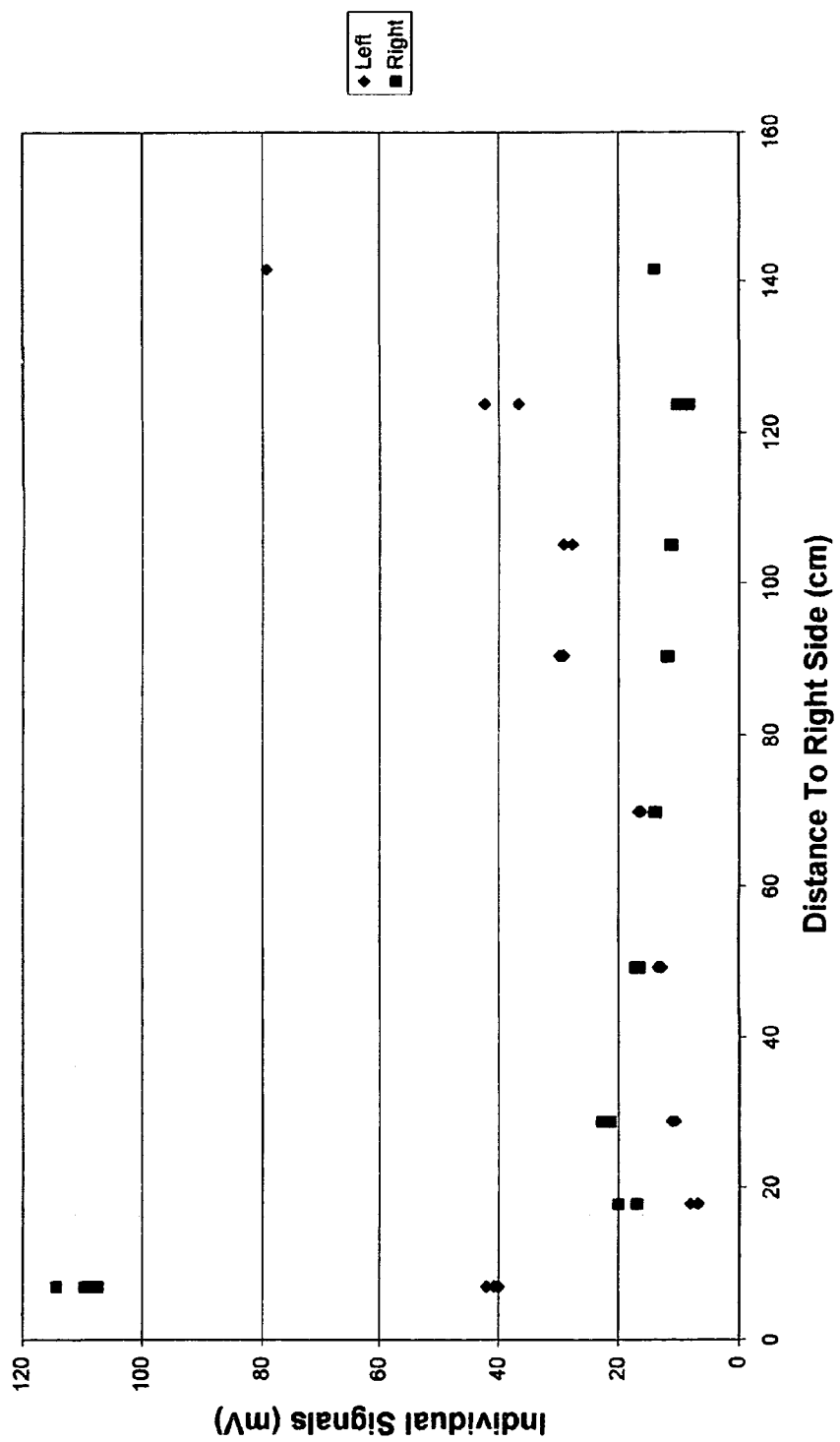
FIG. 10 plots the two individual photodetector signals as a function of distance.
Figure 11:
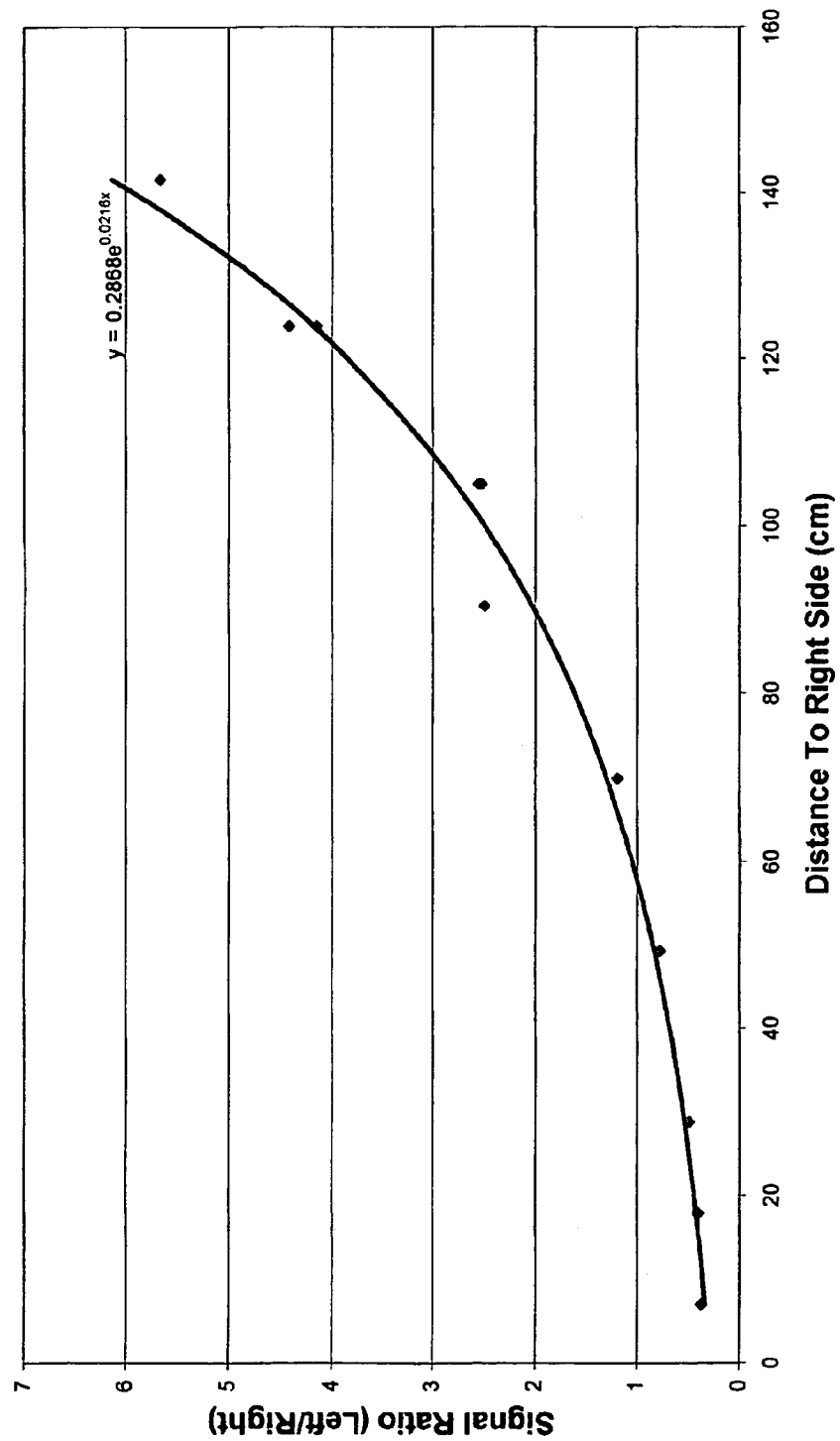
FIG. 11 plots the ratio of the two photodetector signals as a function of distance.

FIG. 10 shows the individual signals from each photodetector at various positions of the flashlight along the fiber. FIG. 11 shows the ratio of the two signals, at each flashlight position. As was found previously in the case of a fluorescent fiber (see U.S. Pat. No. 6,965,709 to Weiss, which is incorporated herein by reference), the individual detector signals show considerable scatter because the illumination was not particularity consistent. However, the ratio of the two signals produced a rather well-behaved response curve, which could be reasonably fit with an simple exponential function (see FIG. 11). As expected from previous experiments using fluorescent fibers, the signal ratio (left/right) increases as the distance from the light source to the right end of the fiber increases (i.e., as the light source moves to the left). This is because as the source moves to the left, the intensity of light emitted from the left end increases, while, at the same time, the intensity of light emitted from the right end decreases.

The particular examples and embodiments discussed above are cited to illustrate particular embodiments of the invention. Other applications and embodiments of the apparatus and method of the present invention will become evident to those skilled in the art.

The scope of the invention is defined by the claims appended hereto.

What is claimed is:

1. A method for measuring an unknown position, X, of an object by using a side-emitting fiber optic position sensor, comprising:

a) providing a side-emitting fiber optic position sensor comprising a side-emitting optical fiber having a first end, an opposing second end, a first photodetector optically coupled to the first end for measuring a first intensity of light, $S_1$, emitted from the first end; and a one-dimensional curvilinear coordinate system, x, having an origin at the first end and extending along the fiber towards the second end;

b) side-illuminating the fiber with a concentrated beam of light; wherein the light source is located at an unknown axial position, X, along the fiber, as measured in the curvilinear coordinate system;

c) in-scattering some of the side-illuminating light into the fiber;

d) guiding the in-scattered light along the fiber;

e) attenuating the intensity of the guided light as the guided light travels further and further away from the unknown axial position, X;

f) measuring with the first photodetector a first intensity of light, $S_1$, emitted from the first end of the fiber;

g) determining the position, X, of the light source by comparing the measured first light intensity, $S_1$, to a calibrated response curve or look-up table; or by inputting $S_1$ into a equation that approximately models the sensor's response;

wherein the fiber does not comprise fluorescent materials; and wherein the method does not include generating fluorescent light by causing fluorescence of fluorescent materials inside of the fiber.

2. The method of claim 1, further comprising measuring with a second photodetector coupled to the second end of the fiber a second intensity of light, $S_2$, emitted from the second end; and then determining the position, X, of the light source by comparing the ratio of the measured light intensities, $S_1/S_2$ to a calibrated response curve or look-up table; or by inputting $S_1/S_2$ into an equation that approximately models the sensor's response.

3. A side-emitting fiber optic position sensor, comprising:

a side-emitting optical fiber having a first end and an opposing second end;

a first photodetector optically coupled to the first end for measuring a first intensity of light, $S_1$, emitted from the first end;

a one-dimensional curvilinear coordinate system, x, having an origin at the first end and extending along the fiber towards the second end;

a movable light source for side-illuminating the fiber with a concentrated beam of light; located at an unknown axial position, X, along the fiber, as measured in the curvilinear coordinate system;

processing means for determining the unknown position, X, of the light source by comparing the measured first light intensity, $S_1$, to a calibrated response curve or look-up table; or by inputting $S_1$ into a equation that approximately models the sensor's response;

wherein the optical fiber does not comprise any fluorescent materials.

4. The sensor of claim 3, further comprising a second photodetector optically coupled to the second end of the fiber for measuring a second intensity of light, $S_2$, emitted from the second end of the fiber.

5. The sensor of claim 4, wherein said processing means determines the unknown position, X, of the light source based on the ratio, $S_1/S_2$, of the first and second intensities.

6. The sensor of claim 3, wherein the side-emitting fiber is wrapped in a spiral pattern around a cylindrical core.

7. The sensor of claim 3, wherein the side-emitting fiber is curved.

8. The sensor of claim 7, wherein the side-emitting fiber is curved in the shape of a double-spiral pattern.

9. The sensor of claim 7, wherein the side-emitting fiber is curved in the shape of a serpentine pattern.

10. The sensor of claim 3, wherein said first and second photodetectors are remotely located, and are coupled to their respective fiber via low-loss fiber optic cables; and further wherein the light source comprises a third low-loss fiber optic cable held in close proximity by a support to said fiber and oriented to illuminate the fiber from the side; wherein the distal end of the third fiber optic cable is coupled to a remotely-located source of light.

11. The sensor of claim 3, further comprising a plurality of side-illuminating light sources disposed at a plurality of axial positions along the fiber, wherein each light source is modulated at a different frequency to allow discrimination of individual light sources by frequency filtering the photodetector's output signal.

12. A side-emitting fiber optic position sensor, comprising:
- a side-emitting optical fiber having a first end and an opposing second end;
- a first photodetector optically coupled to the first end for measuring a first intensity of light, $S_1$, emitted from the first end;
- a one-dimensional curvilinear coordinate system, x, having an origin at the first end and extending along the fiber towards the second end;
- a movable light source for side-illuminating the fiber with a concentrated beam of light; located at an unknown axial position, X, along the fiber, as measured in the curvilinear coordinate system;
- processing means for determining the unknown position, X, of the light source by comparing the measured first light intensity, $S_1$, to a calibrated response curve or look-up table; or by inputting $S_1$ into a equation that approximately models the sensor's response;
- wherein the side-emitting fiber comprises one or more scattering defects selected from the group consisting of serrations, notches, scratches, texture, roughness, corrugations, and combinations thereof.

13. The sensor of claim 12, wherein the side-emitting fiber further comprises one or more fluorescent dopants distributed uniformly along the length of the fiber.

14. A side-emitting fiber optic position sensor, comprising:
- a side-emitting optical fiber having a first end and an opposing second end;
- a first photodetector optically coupled to the first end for measuring a first intensity of light, $S_1$, emitted from the first end;
- a one-dimensional curvilinear coordinate system, x, having an origin at the first end and extending along the fiber towards the second end;
- a movable light source for side-illuminating the fiber with a concentrated beam of light; located at an unknown axial position, X, along the fiber, as measured in the curvilinear coordinate system;
- processing means for determining the unknown position, X, of the light source by comparing the measured first light intensity, $S_1$, to a calibrated response curve or look-up table; or by inputting $S_1$ into a equation that approximately models the sensor's response;
- further comprising a reflective surface placed behind the side-emitting fiber, at the axial location of the movable light source, for creating a second pass of side-illumination light through the fiber.

* * * * *